United States Patent
Kim et al.

(10) Patent No.: US 10,658,117 B2
(45) Date of Patent: *May 19, 2020

(54) MULTILAYER CAPACITOR HAVING EXTERNAL ELECTRODE INCLUDING CONDUCTIVE RESIN LAYER

(71) Applicant: Samsung Electro-Mechanics Co., Ltd., Suwon-si, Gyeonggi-do (KR)

(72) Inventors: Jung Min Kim, Suwon-si (KR); Bon Seok Koo, Suwon-si (KR); Jung Wook Seo, Suwon-si (KR); Yoon Hee Lee, Suwon-si (KR); Kun Hoi Koo, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/271,084

(22) Filed: Feb. 8, 2019

(65) Prior Publication Data

US 2019/0206625 A1   Jul. 4, 2019

Related U.S. Application Data

(62) Division of application No. 15/450,409, filed on Mar. 6, 2017, now Pat. No. 10,446,320.

(30) Foreign Application Priority Data

Apr. 15, 2016   (KR) .................. 10-2016-0046323
Dec. 21, 2016   (KR) .................. 10-2016-0176098

(51) Int. Cl.
*H01G 4/232*   (2006.01)
*H01G 4/30*    (2006.01)
*H01G 4/12*    (2006.01)

(52) U.S. Cl.
CPC ............. *H01G 4/2325* (2013.01); *H01G 4/30* (2013.01); *H01G 4/12* (2013.01)

(58) Field of Classification Search
CPC ......... H01G 4/2325; H01G 4/232; H01G 4/30
See application file for complete search history.

(56) References Cited

U.S. PATENT DOCUMENTS 3,910,852 A   10/1975   Lederman et al.
8,988,850 B1   3/2015   Kodama et al.
(Continued)

FOREIGN PATENT DOCUMENTS

CN   104576052 A   4/2015
CN   104871271 A   8/2015
(Continued)

OTHER PUBLICATIONS

Office Action issued in corresponding U.S. Appl. No. 15/450,409, dated Mar. 14, 2019.
(Continued)

*Primary Examiner* — David M Sinclair
(74) *Attorney, Agent, or Firm* — Morgan, Lewis & Bockius LLP

(57) ABSTRACT

A multilayer ceramic capacitor comprises a body including dielectric layers and internal electrodes; and external electrodes disposed on external surfaces of the body, respectively, wherein each of the external electrodes includes a first electrode layer disposed on the one surface of the body and contacting the internal electrodes; a conductive resin layer disposed on the first electrode layer and including a plurality of metal particles, a conductive connecting part surrounding the plurality of metal particles, a base resin, and an intermetallic compound contacting the first electrode layer and (Continued)

the conductive connecting part; and a second electrode layer disposed on the conductive resin layer and contacting the conductive connecting part.

18 Claims, 8 Drawing Sheets

(56) References Cited

U.S. PATENT DOCUMENTS

| | | | |
|---|---|---|---|
| 9,087,644 | B2 | 7/2015 | Jeon et al. |
| 9,881,737 | B2 | 1/2018 | Kodama et al. |
| 10,446,320 | B2* | 10/2019 | Kim .................... H01G 4/2325 |
| 2005/0012200 | A1 | 1/2005 | Sawada et al. |
| 2006/0044098 | A1 | 3/2006 | Kimura et al. |
| 2011/0303444 | A1 | 12/2011 | Yoshimura |
| 2013/0155573 | A1 | 6/2013 | Kim et al. |
| 2014/0043724 | A1 | 2/2014 | Kang |
| 2014/0085770 | A1 | 3/2014 | Park et al. |
| 2014/0192453 | A1* | 7/2014 | Hong .................... H01G 4/008 361/301.4 |
| 2015/0213953 | A1 | 7/2015 | Jun et al. |
| 2015/0279563 | A1 | 10/2015 | Otani |
| 2015/0279566 | A1 | 10/2015 | Otani |
| 2017/0032896 | A1 | 2/2017 | Otani |
| 2017/0098506 | A1 | 4/2017 | Ando et al. |
| 2017/0301468 | A1 | 10/2017 | Kim et al. |
| 2017/0330689 | A1 | 11/2017 | Hatanaka et al. |
| 2018/0166215 | A1 | 6/2018 | Hamanaka et al. |
| 2019/0295773 | A1* | 9/2019 | Kim .................... H01G 4/2325 |

FOREIGN PATENT DOCUMENTS

| | | |
|---|---|---|
| JP | H05-028829 A | 2/1993 |
| JP | H08-037127 A | 2/1996 |
| JP | 2001-40497 A | 2/2001 |
| JP | 2005-051226 A | 2/2005 |
| JP | 2009-146679 A | 7/2009 |
| JP | 2010-010671 A | 1/2010 |
| JP | 2012-104785 A | 5/2012 |
| JP | 2013-161872 A | 8/2013 |
| JP | 5390408 B2 | 1/2014 |
| JP | 2015-026840 A | 2/2015 |
| KR | 10-2014-0021416 A | 2/2014 |
| KR | 10-2015-0086343 A | 7/2015 |
| KR | 10-2015-0089276 A | 8/2015 |
| WO | 2009/098938 A1 | 8/2009 |
| WO | 2014/097823 A1 | 6/2014 |

OTHER PUBLICATIONS

Office Action issued in related U.S. Appl. No. 16/441,469, dated Jul. 9, 2019.

Office Action issued in related Korean Patent Application No. 10-2016-0176098 dated Jun. 18, 2018.

Office Action issued in related Chinese Patent Application No. 201410244146.4 dated Jul. 23, 2018.

Korean Decision to Grant a Patent dated Feb. 19, 2019 issued in Korean Patent Application No. 10-2016-0176098 (with English translation).

Office Action issued in related U.S. Appl. No. 16/265,548 dated Aug. 8, 2019.

Office Action issued in corresponding U.S. Appl. No. 16/265,548 dated Nov. 18, 2019.

* cited by examiner

MULTILAYER CAPACITOR HAVING EXTERNAL ELECTRODE INCLUDING CONDUCTIVE RESIN LAYER

CROSS-REFERENCE TO RELATED APPLICATION(S)

This application is a divisional application of U.S. patent application Ser. No. 15/450,409, filed Mar. 6, 2017, which claims benefit of priority to Korean Patent Application No. 10-2016-0046323 filed on Apr. 15, 2016 and Korean Patent Application No. 10-2016-0176098 filed on Dec. 21, 2016 in the Korean Intellectual Property Office, the disclosures of which are incorporated herein by reference in their entirety.

BACKGROUND

1. Field

The present disclosure relates to a multilayer capacitor and a method of manufacturing the same.

2. Description of Related Art

A multilayer capacitor is an important chip component with applications in devices such as communications devices, computers, home appliances, automobiles, and the like. Due to its small size, a multilayer capacitor allows for the implementation of high capacitance, may be easily mounted, and is a core passive element used particularly in various electric, electronic and information communications devices such as a mobile phones, computers, digital televisions (TV), and the like.

Recently, in accordance with miniaturization and performance improvements of electronic devices, multilayer capacitors have miniaturized while their capacitance levels have increased. Accordingly, securing a high degree of reliability in multilayer capacitors has become an important consideration.

To secure a high degree of reliability in multilayer capacitors, a conductive resin layer in an external electrode has been disclosed to absorb tension stress generated due to mechanical or thermal factors, to prevent the generation of cracks due to stress.

Such a conductive resin layer serves to electrically and mechanically bond a sintered electrode layer and a plating layer of an external electrode of a multilayer capacitor to each other and also serves to protect the multilayer capacitor from mechanical or thermal stress depending on a process temperature and warpage impact of a circuit board at the time of mounting the multilayer capacitor on the circuit board.

However, in order for the conductive resin layer to serve to electrically and mechanically bond the electrode layer and the plating layer to each other and serve to protect the multilayer capacitor, the resistance of the conductive resin layer should be low. Also, the adhesion strength in the conductive resin layer bonding of the electrode layer and the plating layer should be excellent to prevent a delamination phenomenon of the external electrode that may be generated in such a process.

The conductive resin layer according to the related art has a high degree of resistivity, such that equivalent series resistance (ESR) may be higher than that of a product that does not include the conductive resin layer.

SUMMARY

An aspect of the present disclosure may provide a multilayer capacitor in which the equivalent series resistance (ESR) may be reduced by improving conductivity of external electrodes and improving electrical and mechanical adhesion between an electrode layer and a conductive resin layer, and a method of manufacturing the same.

According to an aspect of the present disclosure, a multilayer capacitor may include: a body including dielectric layers and internal electrodes; and an external electrode on one surface of the body. The external electrode may include: a first electrode layer on one surface of the body and contacting the internal electrodes; a conductive resin layer on the first electrode layer and including a plurality of metal particles, a conductive connecting part surrounding the plurality of metal particles, a base resin, and an intermetallic compound contacting the first electrode layer and the conductive connecting part. A second electrode layer may be on the conductive resin layer and contacting the conductive connecting part.

According to another aspect of the present disclosure, a multilayer capacitor may include: a body including dielectric layers and internal electrodes; and an external electrode disposed on one surface of the body. The external electrode may include: a first electrode layer on one surface of the body and contacting the internal electrodes; a conductive resin layer on the first electrode layer and including a conductive connecting part including a low-melting-point metal, an intermetallic compound contacting the first electrode layer and the conductive connecting part, and a base resin covering the conductive connecting part and the intermetallic compound. A second electrode layer may be on the conductive resin layer and contacting the conductive connecting part.

According to another aspect of the present disclosure, a multilayer capacitor may include: a body including a plurality of dielectric layers and a plurality of first and second internal electrodes alternately disposed with dielectric layers interposed therebetween. The body may include first and second surfaces opposing each other in the thickness direction, third and fourth surfaces connected to the first and second surfaces and opposing each other in the length direction, and fifth and sixth surfaces connected to the first and second surfaces, connected to the third and fourth surfaces, and opposing each other in the width direction. The first and second internal electrodes may be exposed at the third and fourth surfaces, respectively. Intermetallic compounds may be on exposed portions of the first and second internal electrodes. First and second external electrodes may be over the third and fourth surfaces of the body, respectively, and covering the intermetallic compounds. The first and second external electrodes may include: conductive resin layers respectively on the third and fourth surfaces of the body, and including a plurality of metal particles, conductive connecting parts surrounding the plurality of metal particles and contacting the intermetallic compounds, and base resins. Second electrode layers may be on the conductive resin layers and contacting the conductive connecting parts.

According to another aspect of the present disclosure, a multilayer capacitor may include: a body including a plurality of dielectric layers and a plurality of first and second internal electrodes alternately disposed with dielectric layers interposed therebetween. The body may include first and second surfaces opposing each other in the thickness direction, third and fourth surfaces connected to the first and second surfaces and opposing each other in the length direction, and fifth and sixth surfaces connected to the first and second surfaces, connected to the third and fourth surfaces, and opposing each other in the width direction. The first and second internal electrodes may be exposed at the third and fourth surfaces, respectively. Intermetallic compounds may be on exposed portions of the first and second internal electrodes. First and second external electrodes may be on the third and fourth surfaces of the body, respectively, and covering the intermetallic compounds. The first and second external electrodes may include: conductive resin layers respectively over the third and fourth surfaces of the body, and including conductive connecting parts including a low-melting-point metal and contacting the intermetallic compounds and base resins covering the conductive connecting parts. Second electrode layers may be on the conductive resin layers and contacting the conductive connecting parts.

According to another aspect of the present disclosure, a method of manufacturing a multilayer capacitor may include: preparing a body including dielectric layers and internal electrodes; forming a first electrode layer by applying a paste including a conductive metal and glass to one surface of the body to be electrically connected to the internal electrodes and then firing the paste; applying a conductive resin composite to the first electrode layer, the conductive resin composite including metal particles, a thermosetting resin, and a low-melting-point metal having a melting point lower than a hardening temperature of the thermosetting resin; forming a conductive resin layer, so that a melted low-melting-point metal becomes a conductive connecting part surrounding the metal particles and an intermetallic compound is formed between the first electrode layer and the conducive connecting part, by hardening the conductive resin composite; and forming a second electrode layer on the conductive resin layer by plating.

The forming of the conductive resin layer may include: removing oxide films from surfaces of metal particles and low-melting-point metal particles included in the thermosetting resin; and forming the conductive connecting part by a reaction between the metal particles from which the oxide films are removed and the low-melting-point metal particles from which the oxide films are removed and forming the intermetallic compound contacting the first electrode layer by allowing the low-melting-point metal particles having flowability to flow into the surroundings of the first electrode layer.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings.

Multilayer Capacitor

Figure 1:
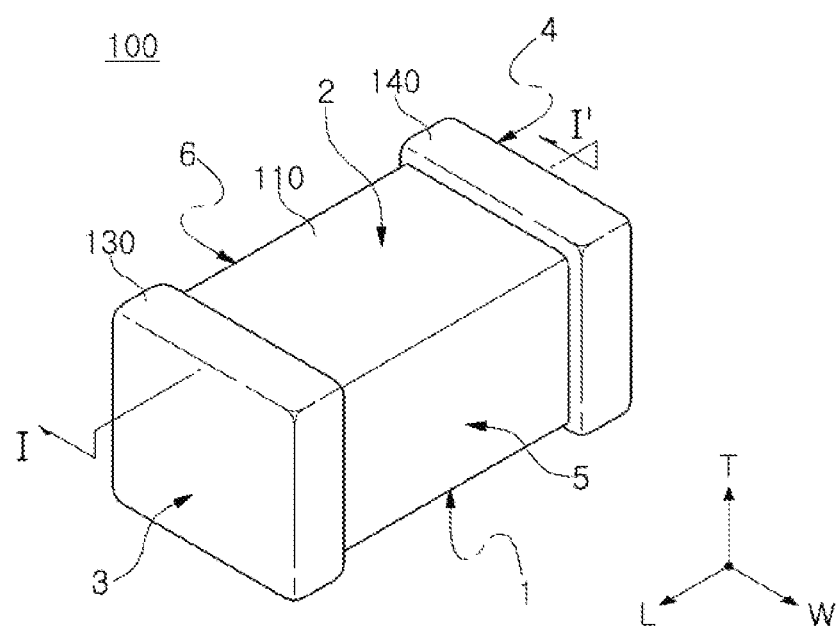
FIG. 1 is a schematic perspective view illustrating a multilayer capacitor according to an exemplary embodiment in the present disclosure.
Figure 2:
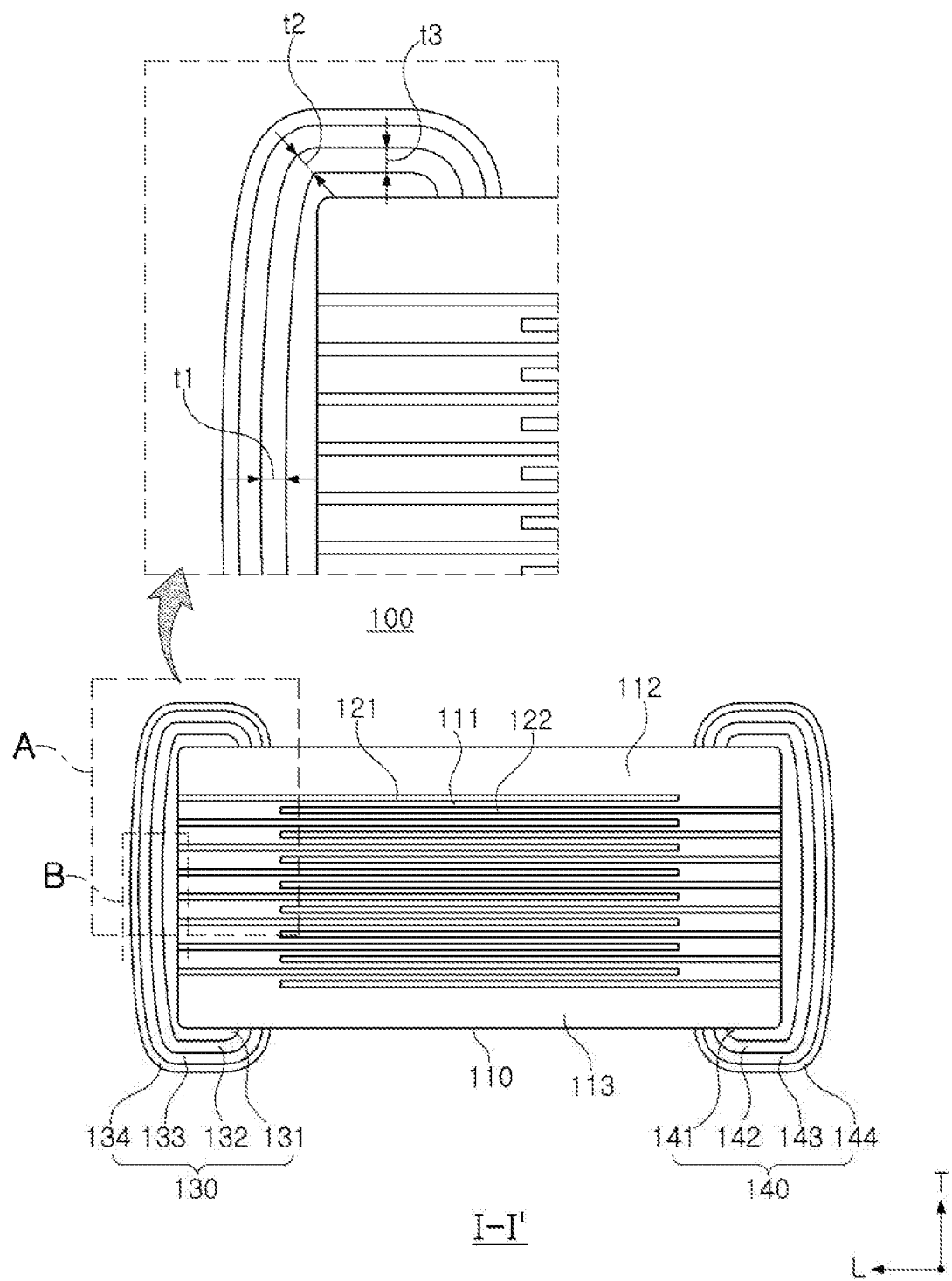
FIG. 2 is a cross-sectional view taken along line I-I' of FIG. 1.

FIG. 1 is a schematic perspective view illustrating a multilayer capacitor according to an exemplary embodiment in the present disclosure, while FIG. 2 is a cross-sectional view taken along line I-I' of FIG. 1.

Referring to FIGS. 1 and 2, a multilayer capacitor 100 according to the exemplary embodiment may include a body 110 and first and second external electrodes 130 and 140.

The body 110 may include an active region, contributing to forming capacitance in the multilayer capacitor, and upper and lower covers 112 and 113 formed as upper and lower margin parts on upper and lower surfaces of the active region, respectively.

In the exemplary embodiment, a shape of the body 110 is not particularly limited, but may be substantially hexahedral.

The body 110 may have a shape substantially similar to a hexahedral shape, even though it may not have a perfectly hexahedral shape due to thickness differences depending on a disposition of internal electrodes and polishing of corner portions.

In order to clearly describe exemplary embodiments in the present disclosure, L, W, and T in the drawings refer to a length direction, a width direction, and a thickness direction, respectively. The thickness direction may be the same as a stacking direction in which dielectric layers are stacked.

First and second surfaces 1 and 2 of the body 110 refer to respective surfaces of the body 110 opposing each other in the thickness direction. Third and fourth surfaces 3 and 4 of the body 110 refer to respective surfaces of the body 110 connected to the first and second surfaces 1 and 2 and opposing each other in the length direction. Fifth and sixth surfaces 5 and 6 of the body 110 refer to respective surfaces of the body 110 connected to the first and second surfaces 1 and 2, connected to the third and fourth surfaces 3 and 4, and opposing each other in the width direction. The first surface 1 may be a mounting surface.

The active region may include a plurality of dielectric layers 111 and a plurality of first and second internal electrodes 121 and 122 alternately stacked with respective dielectric layers 111 interposed therebetween.

The dielectric layer 111 may include ceramic powder particles having a high dielectric constant, such as barium titanate ($BaTiO_3$)-based powder particles or strontium titanate ($SrTiO_3$)-based powder particles. However, a material of the dielectric layer 111 according to the present disclosure is not limited thereto.

The thickness of the dielectric layer 111 may be selected in accordance with the capacitance design of the multilayer capacitor 100. A thickness of one dielectric layer 111 after being sintered may be 0.1 to 10 μm in consideration of a size and capacity of the body 110. However, the thickness of one dielectric layer 111 according to the present disclosure is not limited thereto.

The first and second internal electrodes 121 and 122 may be disposed to face each other with respective dielectric layers 111 interposed therebetween.

The first and second internal electrodes 121 and 122, electrodes having different polarities, may be formed in the stacking direction of the dielectric layers 111 with respective dielectric layers 111 interposed therebetween to be respectively exposed at the third and fourth surfaces 3 and 4 of the body 110 by printing a conductive paste including a conductive metal on the dielectric layers 111 to a predetermined thickness, and may be electrically insulated from each other by respective dielectric layers 111 disposed therebetween.

The first and second internal electrodes 121 and 122 may be electrically connected to the first and second external electrodes 130 and 140, respectively, through portions alternately exposed at the third and fourth surfaces 3 and 4 of the body 110, respectively.

When voltages are applied to the first and second external electrodes 130 and 140, electrical charges may accumulate between the first and second internal electrodes 121 and 122 facing each other. The capacitance of the multilayer capacitor 100 may be in proportion to an area of a region in which the first and second internal electrodes 121 and 122 overlap each other.

The thicknesses of the first and second internal electrodes 121 and 122 may be determined based on the intended use of the multilayer capacitor. For example, the thicknesses of the first and second internal electrodes 121 and 122 may be determined to be in a range of 0.2 to 1.0 μm in consideration of a size and capacity of the body 110. However, the thicknesses of the first and second internal electrodes 121 and 122 according to the present disclosure are not limited thereto.

The conductive metal included in the first and second internal electrodes 121 and 122 may be nickel (Ni), copper (Cu), palladium (Pd), or alloys thereof. However, the conductive metal included in the first and second internal electrodes 121 and 122 according to the present disclosure is not limited thereto.

The upper and lower covers 112 and 113 may be formed of the same material as that of the dielectric layers 111 of the active region and have the same configuration as that of the dielectric layers 111 of the active region except for lacking the internal electrodes.

The upper and lower covers 112 and 113 may be formed by stacking one or more dielectric layers on the upper and lower surfaces of the active region, respectively, in the thickness direction, and may serve to prevent damage to the first and second internal electrodes 121 and 122 from physical or chemical stress.

The first and second external electrodes 130 and 140 may include first electrode layers 131 and 141, conductive resin layers 132 and 142 disposed on the first electrode layers 131 and 141, and second electrode layers 133 and 134, and 143 and 144, disposed on the conductive resin layers 132 and 142, respectively.

The first electrode layers 131 and 141 may contact and be directly connected to the first and second internal electrodes 121 and 122 exposed at the third and fourth surfaces 3 and 4 of the body 110, respectively, thereby securing electrical conduction between the first external electrode 130 and the first internal electrodes 121 and electrical conduction between the second external electrode 140 and the second internal electrodes 122.

The first electrode layers 131 and 141 may include a metal component, which may be nickel (Ni), copper (Cu), palladium (Pd), gold (Au), or alloys thereof, but is not limited thereto.

The first electrode layers 131 and 141 may be fired electrodes formed by firing a paste including the metal described above.

The first electrode layers 131 and 141 may each extend from the third and fourth surfaces 3 and 4 of the body 110, respectively, to portions of the first and second surfaces 1 and 2 of the body 110.

The first electrode layers 131 and 141 may also each extend from the third and fourth surfaces 3 and 4 of the body 110, respectively, to portions of the fifth and sixth surfaces 5 and 6 of the body 110.

Figure 3:
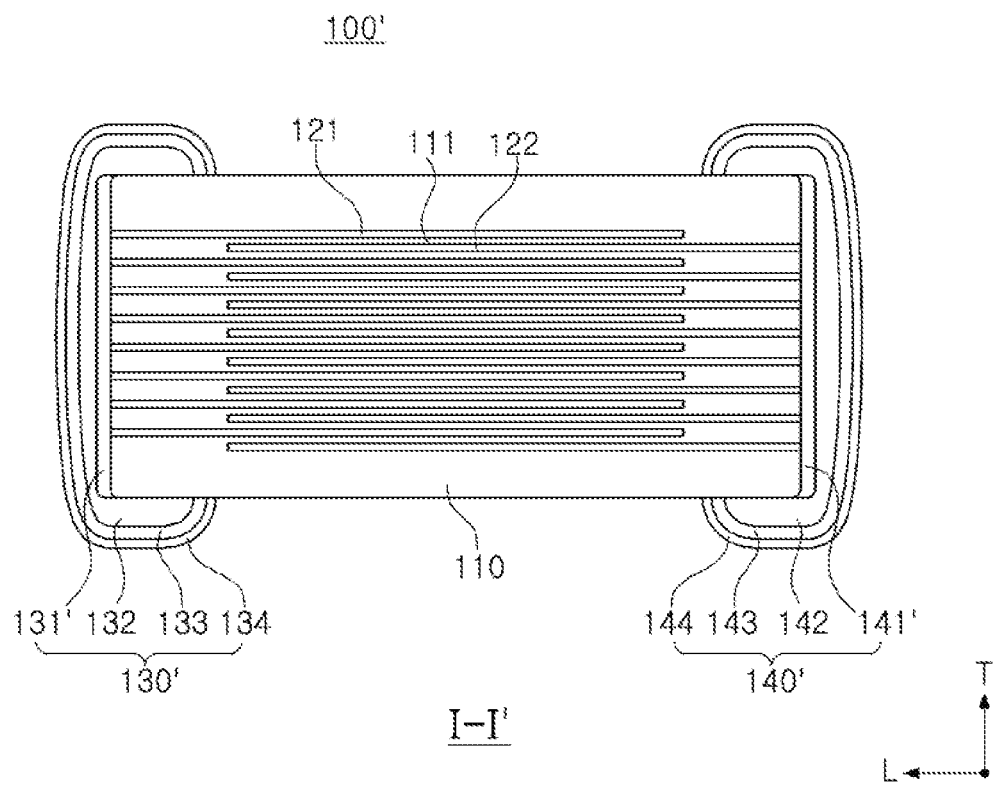
FIG. 3 is a schematic cross-sectional view illustrating a multilayer capacitor according to another exemplary embodiment in the present disclosure.

In another exemplary embodiment, as illustrated in FIG. 3, first electrode layers 131' and 141' of first and second external electrodes 130' and 140' of a multilayer capacitor 100' may only be formed on the third and fourth surfaces 3 and 4 of the body 110 without extending to the first and second surfaces 1 and 2 of the body 110. This may further improve the warpage strength and equivalent series resistance (ESR) of the multilayer capacitor 100'.

Figure 4:
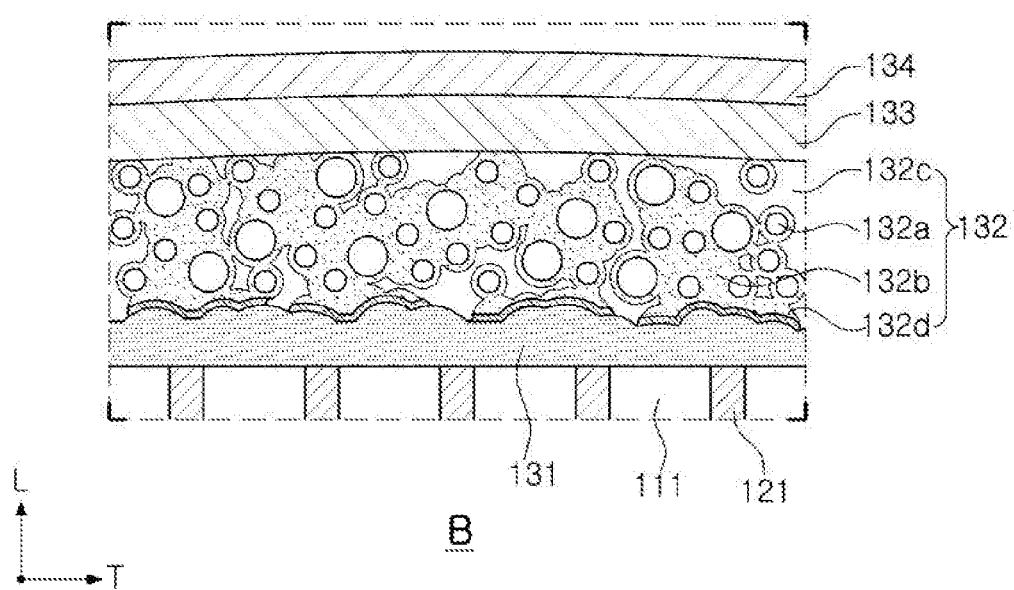
FIG. 4 is a cross-sectional view of region B of FIG. 2 according to an exemplary embodiment.

FIG. 4 is a cross-sectional view of region B of FIG. 2 according to an exemplary embodiment.

While a description will hereinafter be provided in relation to the first external electrode 130, this description is also applicable to the second external electrode 140, since configurations of the first external electrode 130 and the second external electrode 140 are similar to each other, except that the first external electrode 130 is electrically connected to the first internal electrodes 121 and the second external electrode 140 is electrically connected to the second internal electrodes 122.

As illustrated in FIG. 4, the conductive resin layer 132 of the first external electrode 130 may include a plurality of metal particles 132a, a conductive connecting part 132b, a base resin 132c, and an intermetallic compound 132d.

The conductive resin layer 132 may serve to electrically and mechanically bond the first electrode layer 131 and the second electrode layer 133 to each other, and may also serve to prevent the generation of cracks and protect the multilayer capacitor from warpage impact of a board by absorbing tension stress generated in a mechanical or thermal environment when the multilayer capacitor is mounted on the board.

The conductive resin layer 132 may be formed by applying, drying, and hardening a paste in which the plurality of metal particles 132a are dispersed in the base resin 132c onto the first metal layer 131. The metal particles are not completely melted, unlike a method of forming an external electrode by firing according to the related art, such that the metal particles may be present in a form in which they are randomly dispersed in the base resin 132c and be included in the conductive resin layer 132.

Meanwhile, where the metal particles 132a react to both low-melting-point metals forming the conductive connecting part 132b and the intermetallic compound 132d, the metal particles 132a may not be present in the conductive resin layer 132.

For convenience of explanation, a case in which the metal particles 132a are included in the conductive resin layer 132 will hereinafter be illustrated and described in the present exemplary embodiment.

The metal particles 132a may include at least one selected from the group consisting of nickel (Ni), silver (Ag), copper (Cu) coated with silver, copper coated with tin (Sn), and copper.

The metal particles 132a may have a size of 0.2 μm to 20 μm.

Figure 5:
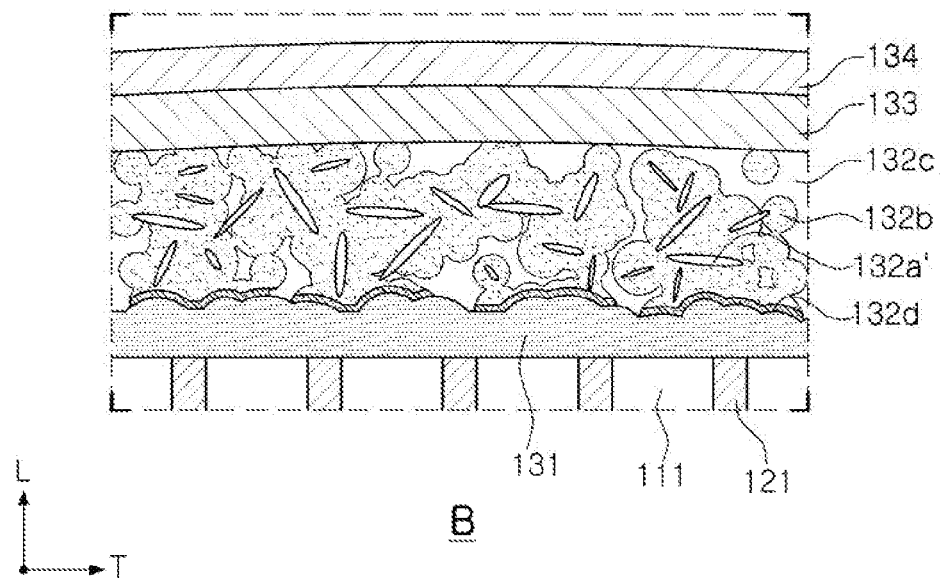
FIG. 5 is a cross-sectional view of region B of FIG. 2 according to another exemplary embodiment with flake-shaped metal particles.
Figure 6:
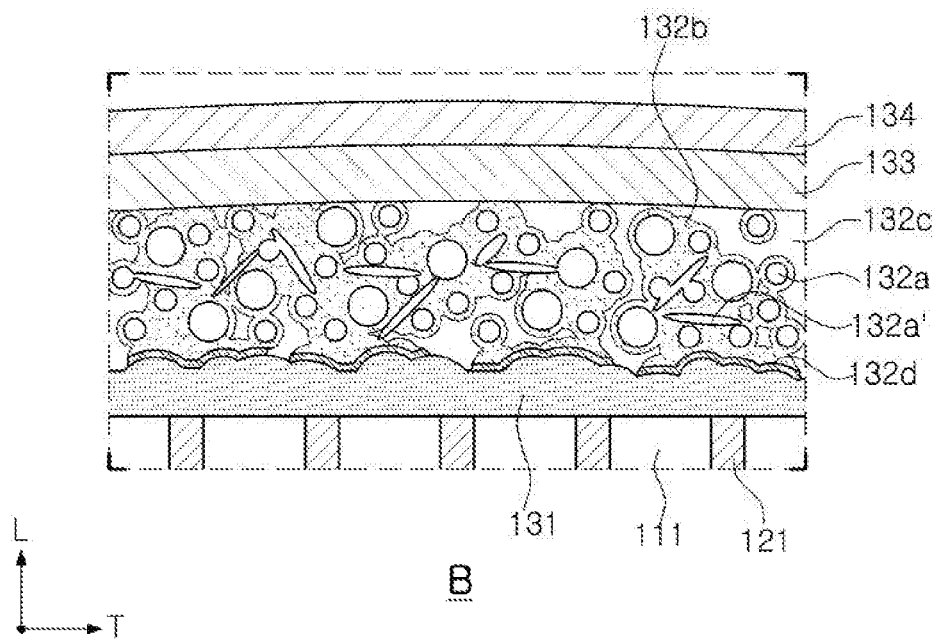
FIG. 6 is a cross-sectional view of region B of FIG. 2 according to another exemplary embodiment with mixtures of metal particles having spherical shapes and flake-shaped metal particles.

The metal particles included in the conductive resin layer 132 may be metal particles having spherical shapes, may be only flake shaped metal particles 132', as illustrated in FIG. 5, or may be mixtures of metal particles 132a having spherical shapes and flake shaped metal particles 132a', as illustrated in FIG. 6.

The conductive connecting part 132b may surround the plurality of metal particles 132a in a melted state to serve to connect the plurality of metal particles 132a to one another, thereby significantly decreasing internal stress of the body 110 and improving high temperature load and moisture resistance load characteristics.

The conductive connecting part 132b may also serve to increase the electrical conductivity of the conductive resin layer 132 and consequently decrease the resistance of the conductive resin layer 132.

Where the metal particles 132a are included in the conductive resin layer 132, the conductive connecting part 132b may serve to increase connectivity between the metal particles 132a to further decrease the resistance of the conductive resin layer 132.

A low-melting-point metal included in the conductive connecting part 132b may have a melting point lower than a hardening temperature of the base resin 132c.

The low-melting-point metal included in the conductive connecting part 132b may have a melting point of 300° C. or less.

The metal included in the conductive connecting part 132b may be an alloy of two or more selected from the group consisting of tin (Sn), lead (Pb), indium (In), copper (Cu), silver (Ag), and bismuth (Bi).

Where the metal particles 132a are included in the conductive resin layer 132, the conductive connecting part 132b may surround the plurality of metal particles 132a in the melted state to serve to connect the plurality of metal particles 132a to one another.

Since the low-melting-point metal included in the conductive connecting part 132b has the melting point lower than the hardening temperature of the base resin 132c, the low-melting-point metal may melt in the drying and hardening processes, and the conductive connecting part 132b may cover the metal particles 132a in the melted state, as illustrated in FIG. 4.

The conductive resin layer 132 may be formed by manufacturing a low-melting-point solder resin paste and then dipping the body in the low-melting-point solder resin paste. Where silver or a metal coated with silver is used as the material of the metal particle 132a when manufacturing the low-melting-point solder resin paste, the conductive connecting part 132b may include $Ag_3Sn$.

The first electrode layer 131 may include Cu, and the intermetallic compound 132d may include Cu—Sn.

When a paste in which the metal particles are dispersed is used as an electrode material, a flow of electrons is smooth when there is contact between metals, but may be rapidly decreased when the base resin surrounds the metal particles.

In order to solve this problem, the amount of base resin may be significantly decreased and the amount of metal may be increased to increase the contact ratio between the metal particles and thereby improve conductivity. However, this may decrease the adhesive strength of the external electrode due to the decreased amount of base resin.

In the present exemplary embodiment, even though an amount of thermosetting resin is not extremely decreased, the contact ratio between the metal particles may be increased by the conductive connecting part, such that the adhesive strength of the external electrode may not be decreased and the electrical conductivity of the conductive resin layer may be improved. Therefore, the equivalent series resistance (ESR) of the multilayer capacitor may be decreased.

The intermetallic compound 132d may be disposed on the first electrode layer 131, and may contact the conductive connecting part 132b to serve to connect the first electrode layer 131 and the conductive connecting part 132b to each other.

The intermetallic compound 132d may serve to improve electrical and mechanical bonding of the conductive resin layer 132 and the first electrode layer 131 to decrease contact resistance between the conductive resin layer 132 and the first electrode layer 131.

The thickness of the intermetallic compound 132d may be 2.0 μm to 5.0 μm. When the thickness of the intermetallic compound 132d is less than 2.0 μm or exceeds 5.0 μm, a change ratio of ESR of 10% or more may be generated at the time of performing a lead heat resistance test.

When the first electrode layer 131 is formed of copper, the intermetallic compound 132d may be formed of copper-tin (Cu—Sn).

The intermetallic compound 132d may be disposed on the first electrode layer 131 in a form of a plurality of islands, which may have a layer form.

The base resin 132c may include a thermosetting resin having electrical insulating properties.

The thermosetting resin may be, for example, an epoxy resin. However, the thermosetting resin according to the present disclosure is not limited thereto.

The base resin 132c may serve to mechanically bond the first and second electrode layers 131 and 133 to each other.

The conductive resin layer 132 according to the present exemplary embodiment may include a connection part formed over the third surface 3 of the body and a band part extended from the connection part to portions of the first and second surfaces 1 and 2 of the body 110.

As illustrated in region A of FIG. 2, in the conductive resin layer 132, when a thickness of a central portion of the connection part is t1, a thickness of a corner portion is t2, and a thickness of a central portion of the band part is t3, t2/t1≥0.05 and t3/t1≤0.5.

When t2/t1 is less than 0.05, there may be an increased possibility that a crack will be generated in a corner portion of the body of the multilayer capacitor, which may lead to defects such as a short-circuit, a moisture resistance defect, and the like.

When t3/t1 exceeds 0.5, the band part of the external electrode may have an excessively rounded shape, such that it is difficult to use a jig at the time of mounting the multilayer capacitor on a board, and a phenomenon where the multilayer capacitor topples over after it is mounted on the board may occur, which may increase the mounting defect rate of the multilayer capacitor. In addition, the thickness of the external electrode may be increased, which may decrease the unit capacitance of the multilayer capacitor.

The second electrode layer may be a plating layer.

The second electrode layer may have a structure in which a nickel plating layer 133 and a tin plating layer 134 are sequentially stacked as an example. The nickel plating layer 133 may contact the conductive connecting part 132b and the base resin 132c of the conductive resin layer 132.

Mechanism of Forming Conductive Resin Layer

Figure 7:
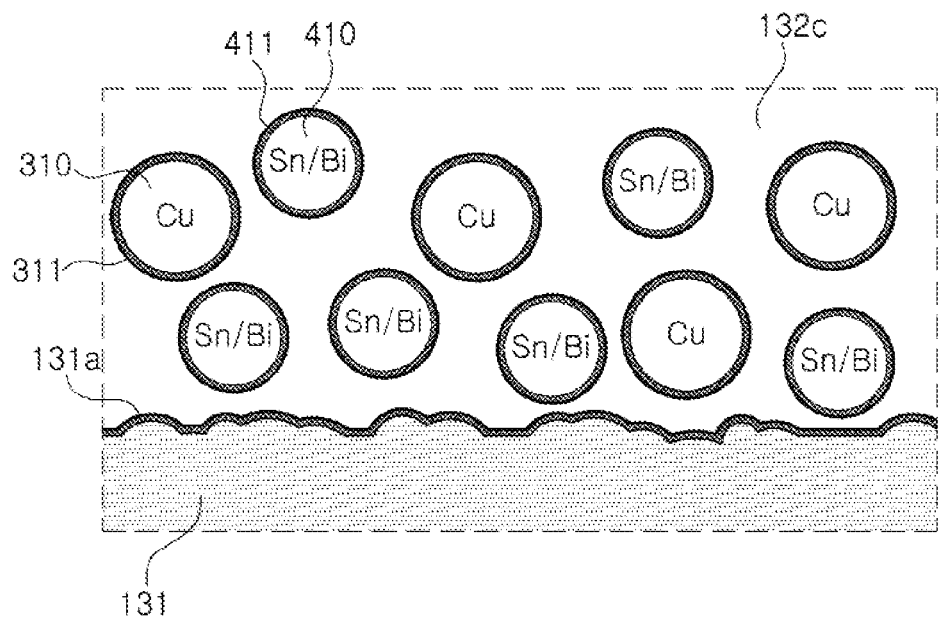
FIG. 7 is a diagram illustrating a state in which copper particles and tin/bismuth particles are dispersed in epoxy.
Figure 8:
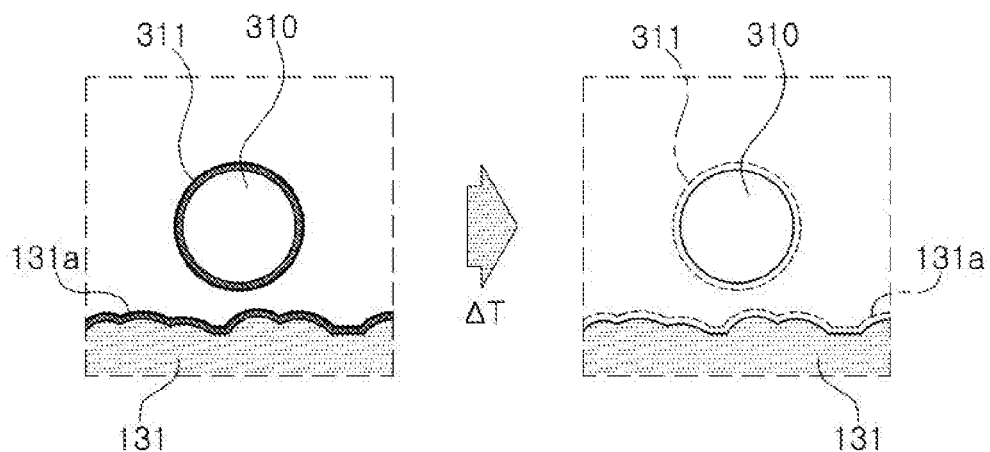
FIG. 8 is a diagram illustrating a state in which an oxide film of a copper particle is removed using an oxide film remover or heat.
Figure 9:
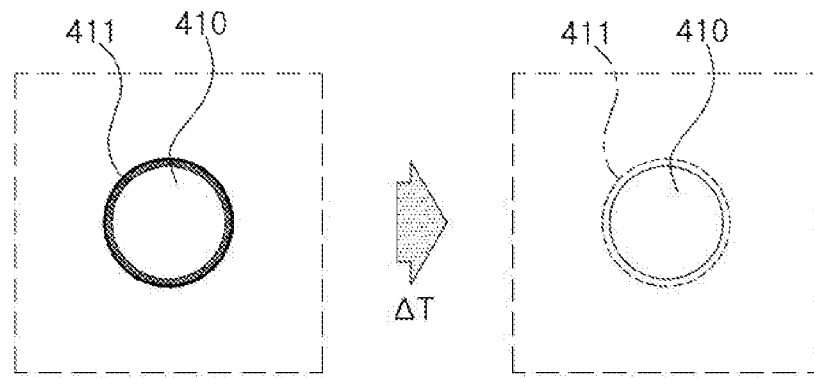
FIG. 9 is a diagram illustrating a state in which an oxide film of a tin/bismuth particle is removed using an oxide film remover or heat.
Figure 10:
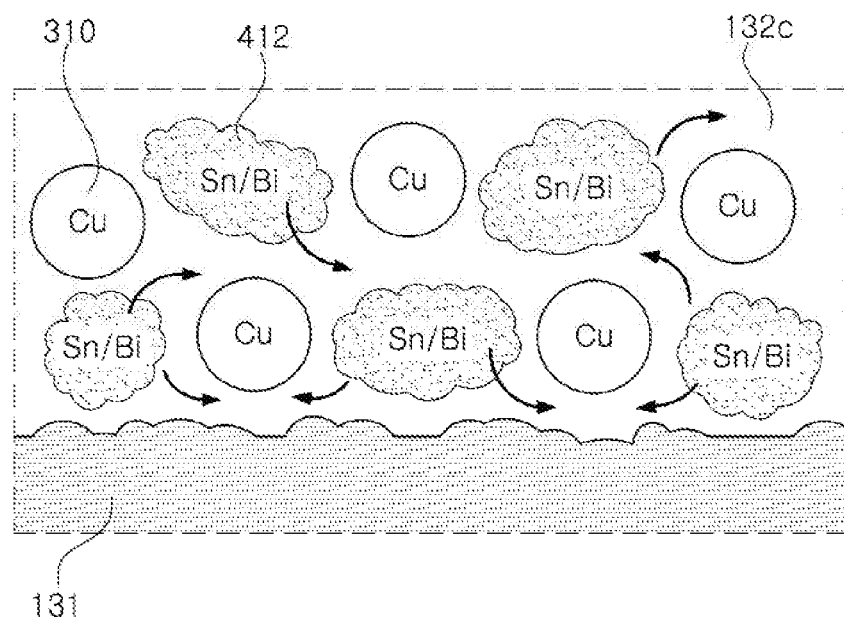
FIG. 10 is a diagram illustrating a state in which tin/bismuth particles are melted to have flowability.
Figure 11:
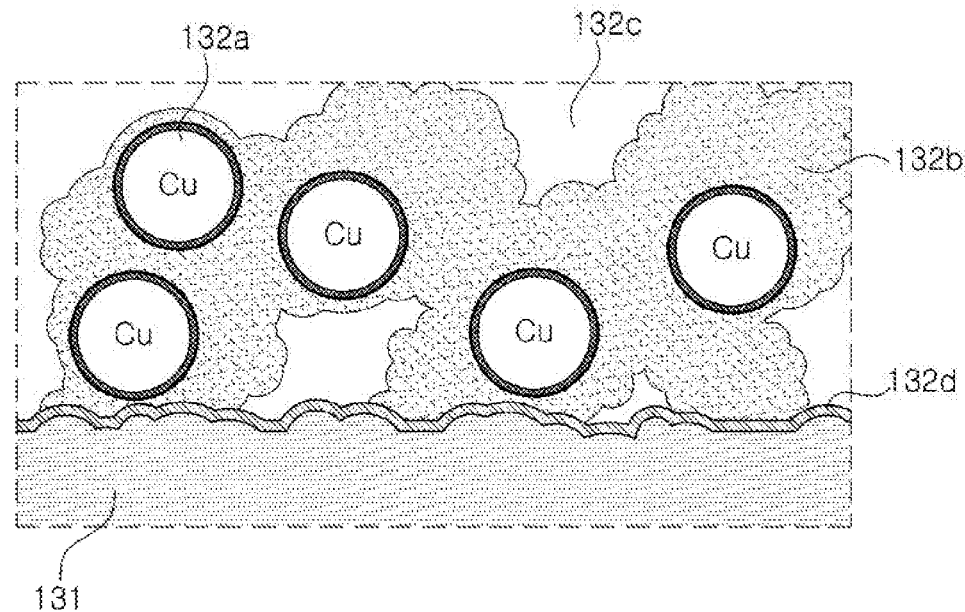
FIG. 11 is a diagram illustrating a state in which copper particles and tin/bismuth particles react with each other to form an intermetallic compound.

FIG. 7 is a diagram illustrating a state in which copper particles and tin/bismuth particles are dispersed in epoxy, FIG. 8 is a diagram illustrating a state in which an oxide film of a copper particle is removed using an oxide film remover or heat, FIG. 9 is a diagram illustrating a state in which an oxide film of a tin/bismuth particle is removed using an oxide film remover or heat, FIG. 10 is a diagram illustrating a state in which tin/bismuth particles are melted to have flowability, FIG. 11 is a diagram illustrating a state in which copper particles and tin/bismuth particles react with each other to form a copper-tin layer.

A mechanism of forming the conductive resin layer 132 using copper-tin will hereinafter be described with reference to FIGS. 7 through 11.

Referring to FIGS. 7 through 9, copper particles 310 and tin/bismuth (Sn/Bi) particles 410, which are low-melting-point metal particles, included in the base resin 132c may have oxide films 311 and 411 present on surfaces thereof, respectively. The first electrode layer 131 may also have an oxide layer 131a present on a surface thereof.

The oxide films 311 and 411 may hinder a copper-tin layer from being formed by a reaction between the copper particles 310 and the tin/bismuth particles 410, and may be removed using an oxide film remover included in epoxy or heat (ΔT) at the time of performing a hardening process or be removed using acid solution processing, if necessary. The oxide film 131a of the first electrode layer 131 may be removed together with the oxide films 311 and 411.

The oxide film remover may be an acid, a base, hydrogen halide, or the like. However, the oxide film remover according to the present disclosure is not limited thereto.

Referring to FIG. 10, the tin/bismuth particles from which the oxide films are removed may start to melt at about 140° C., and the melted tin/bismuth particles 412 may have flowability, may move toward the copper particles 310 from which the oxide films 311 are removed and react to the copper particles 310 at a predetermined temperature to form the conductive connecting part 132b, and may move toward the first electrode layer 131 to form the intermetallic compound 132d, which is a copper-tin layer, as illustrated in FIG. 11.

The intermetallic compound 132d formed as described above may be connected to the conductive connecting part 132b of the conductive resin layer 132, formed of copper-tin to decrease contact resistance between the first electrode layer 131 and the conductive resin layer 132.

The copper particles 132a illustrated in FIG. 11 indicate copper particles present in the conductive connecting part 132b after the reaction described above.

Surface oxidation may be easily generated in the tin/bismuth particles 410. In this case, the surface oxidation may hinder the intermetallic compound 132d from being formed.

The tin/bismuth particles 410 may be surface-treated so that a content of carbon is 0.5 to 1.0 wt % in order to prevent the surface oxidation.

Sn/Bi (tin/bismuth particle) is used as a low-melting-point metal particle in the present exemplary embodiment. Alternatively, Sn—Pb, Sn—Cu, Sn—Ag, Sn—Ag—Cu, or the like, may be used as the low-melting-point metal particle.

The disposition of an intermetallic compound 132d on the first electrode layer 131 may be selected depending on sizes, contents, compositions, and the like, of the copper particles 310 and the tin/bismuth particles 410.

A size of the copper particles 310 for forming the intermetallic compound 132d may be 0.2 μm to 20 μm.

Figure 12:
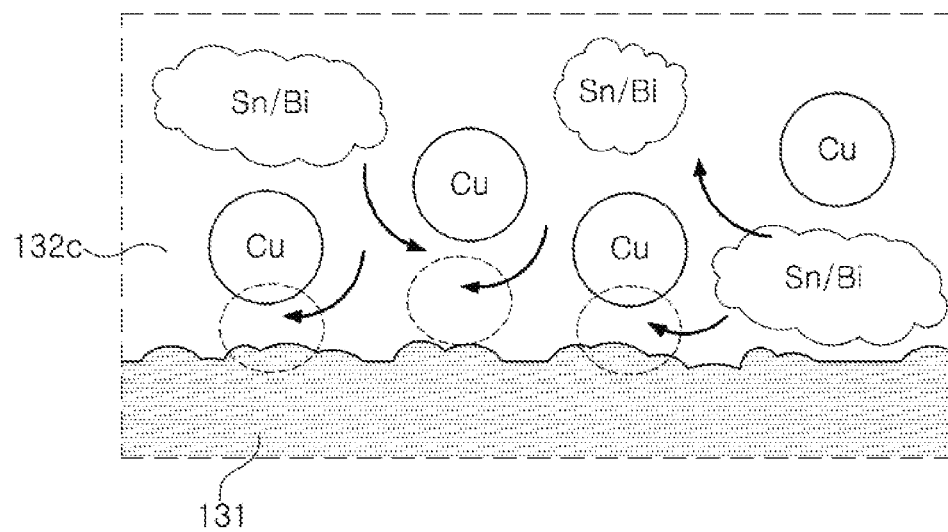
FIG. 12 is a diagram illustrating a flow of a tin/bismuth solution where copper particles are large at the time of forming a conductive resin layer.

In order to form the intermetallic compound, the tin/bismuth particles melted at a predetermined temperature to be present in a solution state need to flow to the surrounding of the copper particles. When the size of the copper particles exceeds 20 μm as illustrated in FIG. 12, an interval between the first electrode layer 131 and the copper particles may be excessively wide, such that a tin/bismuth solution may not easily move between the first electrode layer 131 and the copper particles, thereby hindering formation of the intermetallic compound.

Figure 13:
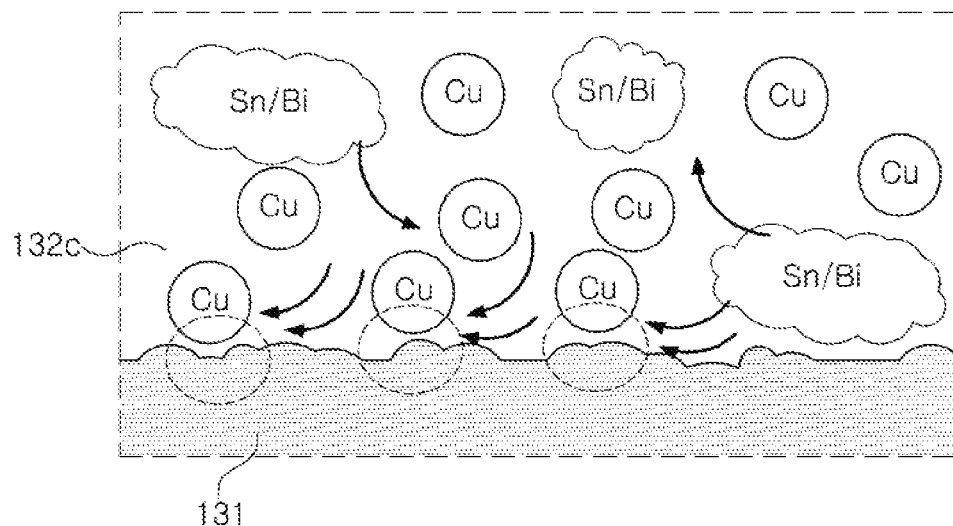
FIG. 13 is a diagram illustrating a flow of a tin/bismuth solution where copper particles are small at the time of forming a conductive resin layer.

When the size of the copper particles is 20 μm or less as illustrated in FIG. 13, a distance between the copper particles may be decreased, and the tin/bismuth solution may more easily move to a surface of the first electrode layer 131 due to capillary force generated in regions in which the distance between the copper particles is decreased, such that the intermetallic compound may be easily formed.

When the size of the copper particles is less than 0.2 μm, oxidation may be generated on surfaces of the copper particles to hinder formation of the intermetallic compound.

In the presently described mechanism, a melting temperature of the tin-bismuth particles and a forming temperature of the intermetallic compound need to be lower than a hardening temperature of the epoxy resin, which is the base resin.

When the melting temperature of the tin-bismuth particles and the forming temperature of the intermetallic compound are higher than the hardening temperature of the epoxy resin, the base resin may be first hardened, such that the melted tin-bismuth particles may not move to the surfaces of the copper particles and thus, the copper-tin layer, which is the intermetallic compound, may not be formed.

The content of the tin-bismuth particles for forming the intermetallic compound may be 10 wt % to 90 wt % with respect to total metal particles.

When the content of the tin-bismuth particles is less than 10 wt %, the size of the intermetallic compound formed by a reaction of the tin-bismuth particles to the copper particles in the conductive resin layer is excessively increased, such that it may be difficult to dispose the conductive connecting part on the first electrode layer.

When the content of the tin-bismuth particles exceeds 90 wt %, the tin-bismuth particles react with each other, such that only sizes of the tin-bismuth particles may be increased without forming the intermetallic compound.

The content of tin in the tin-bismuth particles may also need to be adjusted.

In the present exemplary embodiment, a component reacting to the copper particles to form the intermetallic compound may be tin, and thus, the content (x) of Sn in $Sn_x$-$Bi_y$ may be 10 wt % or more with respect to total metal particles in order to secure a predetermined level of reactivity or more.

When the content (x) of Sn is less than 10 wt % with respect to the total metal particles, ESR of the manufactured multilayer capacitor may be increased.

In the multilayer capacitor in which the conductive resin layer is used in the external electrode, ESR may be affected by several kinds of resistance components applied to the external electrode.

An example of these resistance components may include resistance of the first electrode layer, contact resistance between the conductive resin layer and the first electrode layer, resistance of the conductive resin layer, contact resistance between the second electrode layer and the conductive resin layer, and resistance of the second electrode layer.

The resistance of the first electrode layer and the resistance of the second electrode layer are fixed values that may not be varied.

In a multilayer capacitor according to the related art where a conductive resin layer is simply used in an external electrode, which is Comparative Example 1, a plurality of metal particles and the metal particles and a first electrode layer were separated from each other by a base resin, such that contact resistance between the conductive resin layer and the first electrode layer and contact resistance between a second electrode layer and the conductive resin layer were large. As a result, ESR of the multilayer capacitor was 28.5 MΩ, relatively high.

Comparative Example 2 is a multilayer capacitor having an external electrode structure configured so that a plurality of metal particles are connected to each other using a low-melting-point metal.

In this case, the connectivity between the metal particles increased such that the conductivity of the conductive resin layer increased, and the resistance of the conductive resin layer decreased such that the ESR of the multilayer capacitor slightly decreased to 26.1 MΩ as compared to Comparative Example 1. However, electricity flows in a tunneling scheme when the first electrode layer and the conductive connecting part are separated from each other by a base resin, such that the ESR slightly decreased as compared to Comparative Example 1.

In the Inventive Example, copper particles, tin/bismuth particles, an oxide film remover, and 4 to 15 wt % of epoxy resin were mixed with one another depending on the above-mentioned condition and were dispersed using a 3-roll-mill to prepare a conductive resin, and the conductive resin was applied onto a first electrode layer to form an external electrode.

According to Inventive Example, an intermetallic compound of a conductive resin layer of the external electrode was disposed on the first electrode layer, a conductive connecting part was formed in a base resin to contact the intermetallic compound to form a current channel, and the conductive connecting part was configured to surround a plurality of metal particles in a melted state and contact a second electrode layer to decrease resistance of the conductive resin layer. This also further decreases contact resistance between the conductive resin layer and the first electrode layer and contact resistance between the second electrode layer and the conductive resin layer, such that the ESR of the multilayer capacitor significantly decreased to 18.5 MΩ.

When the conductive connecting part is formed of a low-melting-point metal having high conductivity, the conductivity of the conductive resin layer is further improved, such that the resistance of the conductive resin layer may be further decreased, and thus, the ESR of the multilayer capacitor may be further decreased.

In the Inventive Example, the resistance of the conductive resin layer may be decreased by using the low-melting-point metal as a material of the conductive connecting part to improve the conductivity of the conductive resin layer, and the intermetallic compound may be formed between the conductive resin layer and the first electrode layer to electrically connect the conductive resin layer and the first electrode layer to each other, thereby decreasing the contact resistance between the conductive resin layer and the first electrode layer to significantly decrease the ESR of the multilayer capacitor.

In the Inventive Example, adhesion and connectivity of the conductive resin layer may be increased by the conductive connecting part to improve warpage strength.

Table 1 shows defect rates of chips depending on a bending depth. As shown in Table 1, in order to measure warpage strength, both ends of a board having a chip mounted on a central portion thereof are fixed, and the central portion of the board is pressed at a speed of 1 mm/sec using a tip.

A chip having a 1608 size was used in order to easily compare warpage strength influences with one another.

Ten samples were measured for each of Comparative Examples 1 and 2 and the Inventive Example to obtain defect rates (%).

The process of increasing a pressing speed by 1 mm/sec and measuring a change amount (ΔC) in capacitance of the chip at the increased pressing speed for five seconds was repeated. When ΔC was 12.5% or more of a capacitance value (an initial value) of the chip before being bent, the chip was categorized as being defective.

Referring to Table 1, in the Inventive Example, no defects were generated, even at a bending depth of 10 mm.

TABLE 1

| Bending Depth (mm) | Comparative Example 1 (Defective Rate %) | Comparative Example 2 (Defective Rate %) | Inventive Example (Defective Rate %) |
|---|---|---|---|
| 1 | 0 | 0 | 0 |
| 2 | 20 | 0 | 0 |
| 3 | 80 | 0 | 0 |
| 4 | 100 | 10 | 0 |
| 5 | 100 | 40 | 0 |
| 6 | 100 | 40 | 0 |
| 7 | 100 | 50 | 0 |
| 8 | 100 | 60 | 0 |
| 9 | 100 | 60 | 0 |
| 10 | 100 | 60 | 0 |

Modified Example

Figure 14:
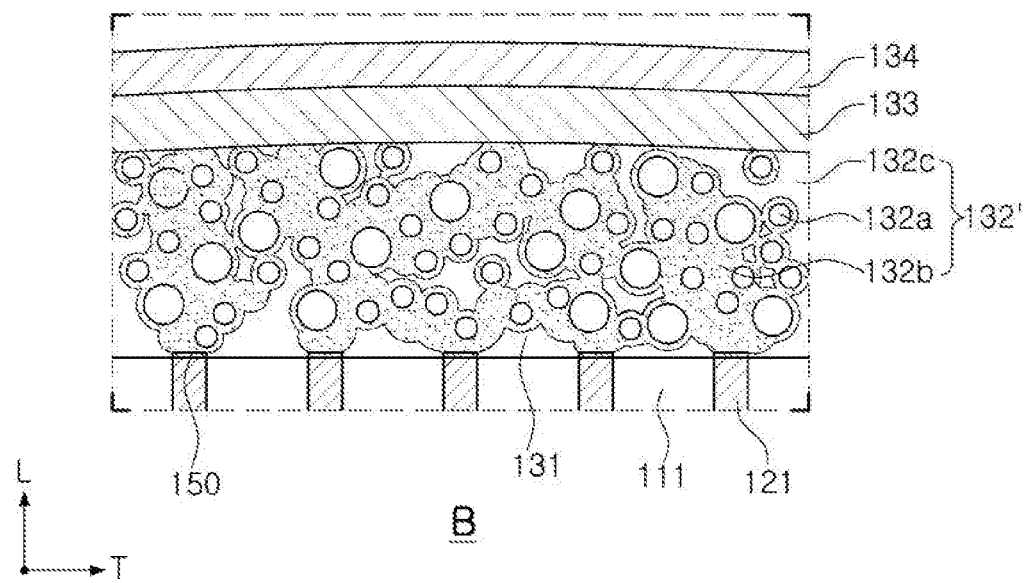
FIG. 14 is a cross-sectional view of region B of FIG. 2 according to another exemplary embodiment with the intermetallic compound formed of a plurality of islands.

Referring to FIGS. 1, 2, and 14, a multilayer capacitor according to another exemplary embodiment in the present disclosure may include a body 110, intermetallic compounds 150, and first and second external electrodes 130 and 140.

A detailed description of structures similar to those described above will be omitted in order to avoid overlapping descriptions, and a disposition structure of an intermetallic compound 150 different from that of the abovementioned exemplary embodiment will be illustrated and be described in detail.

The body 110 may include a plurality of dielectric layers 111 and first and second internal electrodes 121 and 122 disposed to be respectively exposed at the third and fourth surfaces 3 and 4 of the body 110 with dielectric layers 111 interposed therebetween.

The intermetallic compounds 150 may be disposed on the third and fourth surfaces 3 and 4 of the body 110 to contact exposed portions of the first and second internal electrodes 121 and 122, respectively.

The intermetallic compound 150 may have a form of a plurality of islands, if necessary, and the plurality of islands may have a layer form.

The first and second external electrodes 130 and 140 may be disposed on the third and fourth surfaces 3 and 4 of the body 110, respectively, to cover the intermetallic compounds 150.

A description will hereinafter be provided in relation to the first external electrode 130, but is also applicable to the second external electrode 140.

The first external electrode 130 may be disposed on the third surface 3 of the body 110 to cover the intermetallic compound 150, and may include a conductive resin layer 132' including a conductive connecting part 132b and a base resin 132c, and second electrode layers 133 and 134 disposed on the conductive resin layer 132' and contacting the conductive connecting part 132b of the conductive resin layer 132'.

The conductive connecting part 132b may contact the intermetallic compound 150, and surround a plurality of metal particles 132a in a melted state to connect the plurality of metal particles 132a to one another.

According to the structure described above, a first electrode layer is not present in the first external electrode 130, such that bending stress of the first electrode layer generated at the time of bending a chip may be solved. Bonding force of the first external electrode 130 may be increased by the intermetallic compound 150, such that warpage strength of the multilayer capacitor may be further improved as compared to an exemplary embodiment in which the first electrode layer is included in the external electrode.

Electrical connectivity between the first internal electrode 121 and the conductive resin layer 132' may be improved by the intermetallic compound 150, such that contact resistance between the first internal electrode 121 and the conductive resin layer 132' may be decreased, thereby further decreasing the ESR of the multilayer capacitor.

In the present exemplary embodiment, the first electrode layer is not present between the internal electrode and the conductive resin layer. Therefore, in a case in which the internal electrode includes Ni, the intermetallic compound may include Ni—Sn generated by a reaction between Ni of the internal electrode and a low-melting-point solder of the conductive resin layer.

The metal included in the conductive connecting part 132b may have a melting point lower than a hardening temperature of the base resin 132c.

The metal of the conductive connecting part 132b may have a low-melting-point of 300° C. or less.

The intermetallic compound 150 may be formed to have an area equal to or greater than 20% of the area by which the first internal electrodes 121 and the conductive resin layer 132' contact each other. When the intermetallic compound 150 is formed to have an area less than 20% of the area by which the first internal electrodes 121 and the conductive resin layer 132' contact each other, the ESR of the multilayer capacitor may exceed 28.5 mΩ, such that an ESR decrease effect may not be appropriately implemented.

In the present exemplary embodiment, a pass/fail reference of the ESR of the multilayer capacitor is 28.5 mΩ. This numerical value is an average ESR value when the conductive resin layer is formed of Cu-epoxy without using the intermetallic compound. When the intermetallic compound 150 is formed to have an area equal to or greater than 50% of the area by which the first internal electrodes 121 and the conductive resin layer 132' contact each other, an ESR decrease effect may be significantly improved.

The thickness of the intermetallic compound 150 may be 2.0 μm to 5.0 μm. When the thickness of the intermetallic compound 150 is less than 2.0 μm or exceeds 5.0 μm, a change ratio of ESR of 10% or more may be generated at the time of performing a lead heat resistance test.

The intermetallic compound 150 may be disposed in a form of a plurality of islands on the first electrode layer 131. The plurality of islands may have a layer form.

Method of Manufacturing Multilayer Capacitor

A method of manufacturing a multilayer capacitor according to an exemplary embodiment in the present disclosure will hereinafter be described in detail, but the present disclosure is not limited thereto, and a description for contents overlapping the contents of the multilayer capacitor described above in a description for a method of manufacturing a multilayer capacitor according to the present exemplary embodiment will be omitted.

In the method of manufacturing a multilayer capacitor according to the present exemplary embodiment, first, a slurry including powder particles such as barium titanate ($BaTiO_3$) powder particles, or the like, may be applied onto carrier films and be dried to prepare a plurality of ceramic green sheets, thereby forming dielectric layers and covers.

The ceramic green sheet may be manufactured by preparing a slurry by mixing ceramic powder particles, a binder, and a solvent with one another and forming the slurry as a sheet having a thickness of several micrometers by a doctor blade method, or the like.

A conductive paste for an internal electrode including a conductive metal such as nickel powder particles, or the like, may be applied to the ceramic green sheets by a screen printing method, or the like, to form internal electrodes.

A plurality of ceramic green sheets on which the internal electrodes are printed may be stacked, ceramic green sheets on which the internal electrodes are not printed may be stacked on upper and lower surfaces of a laminate, and these ceramic green sheets may be sintered to form a body.

The body may include the dielectric layers, the internal electrodes, and the covers. The dielectric layers may be formed by sintering the ceramic green sheets on which the internal electrodes are printed, and the covers may be formed by sintering the ceramic green sheets on which the internal electrodes are not printed. The internal electrodes may include first and second internal electrodes having different polarities.

First electrode layers may be formed on third and fourth surfaces of the body, respectively, to be electrically connected to the first and second internal electrodes, respectively.

The first electrode layer may be formed by applying and firing a paste including a conductive metal and glass.

The conductive metal is not particularly limited, but may be one or more selected from the group consisting of, for example, nickel, copper, palladium, gold, silver, and alloys thereof.

The glass is not particularly limited, but may be a material having the same composition as that of glass used for manufacturing an external electrode of a general multilayer capacitor.

A conductive resin composite including metal particles, a thermosetting resin, and a low-melting-point metal having a melting point lower than that of the thermosetting resin may be prepared.

The conductive resin composite may be prepared by mixing, for example, copper particles, which are the metal particles, tin/bismuth particles, which are the low-melting-point metal, an oxide film remover, and 4 to 15 wt % of epoxy resin with one another and then dispersing them using a 3-roll mill.

The conductive resin composite may be applied on outer surfaces of the first electrode layers and be dried and hardened to form conductive resin layers including intermetallic compounds.

When some of the metal particles do not completely react to the low-melting-point metal, such that they remain, the remaining metal particles may be present in the conductive resin layer in a state in which they are covered by the melted low-melting-point metal.

The metal particles may include at least one selected from the group consisting of nickel, silver, copper coated with silver, copper coated with tin, and copper. However, the metal particles according to the present disclosure are not limited thereto.

The thermosetting resin may include, for example, an epoxy resin. However, the thermosetting resin according to the present disclosure is not limited thereto, but may be, for example, a bisphenol A resin, a glycol epoxy resin, a novolak epoxy resin, or a resin that is in a liquid state at room temperature due to a small molecular weight among derivatives thereof.

The method of manufacturing a multilayer capacitor according to the present exemplary embodiment may further include forming second electrode layers on the conductive resin layers. The second electrode layer may be formed by plating, and may include, for example, a nickel plating layer and a tin plating layer further formed on the nickel plating layer.

As set forth above, according to the exemplary embodiment in the present disclosure, the conductive resin layer of the external electrode disposed on the first electrode layer may include the conductive connecting part and the intermetallic compound contacting the first electrode layer and the conductive connecting part, and the conductive connecting part may contact the plurality of metal particles and the second electrode layer, such that the ESR of the multilayer capacitor may be decreased and the warpage strength of the multilayer capacitor may be improved.

While exemplary embodiments have been shown and described above, it will be apparent to those skilled in the art that modifications and variations could be made without departing from the scope of the present invention as defined by the appended claims.

What is claimed is:

1. A multilayer capacitor comprising:
   a body including dielectric layers and internal electrodes; and
   an external electrode disposed on one surface of the body, respectively,
   wherein the external electrode includes:
   a first electrode layer disposed on the one surface of the body and contacting the internal electrodes; and
   a conductive resin layer disposed on the first electrode layer and including a plurality of metal particles, a conductive connecting part surrounding the plurality of metal particles, a base resin, and an intermetallic compound contacting the first electrode layer and the conductive connecting part;
   the metal particles of the conductive resin layer are composed of at least one material selected from a group consisting of copper, nickel, silver, copper coated with silver, and copper coated with tin,
   the intermetallic compound is composed of copper-tin,
   the body includes first and second surfaces opposing each other, third and fourth surfaces connected to the first and second surfaces and opposing each other, and fifth and sixth surfaces connected to the first and second surfaces, connected to the third and fourth surfaces, and opposing each other,
   the internal electrodes are alternately exposed from the third and fourth surfaces of the body,
   the first electrode layers are disposed on the third and fourth surfaces of the body to be connected to exposed portions of the internal electrodes, respectively,
   the external electrodes include connection parts disposed on the third and fourth surfaces of the body and band parts extended from the connection parts to portions of the first and second surfaces of the body, respectively, and
   $t2/t1 \geq 0.05$ and $t3/t1 \leq 0.5$, in which $t1$ is a thickness of a central portion of the connection part, $t2$ is a thickness of a corner portion, and $t3$ is a thickness of a central portion of the band part.

2. The multilayer capacitor of claim 1, wherein the first electrode layer includes copper.

3. The multilayer capacitor of claim 1, wherein the conductive connecting part has a melting point lower than a hardening temperature of the base resin.

4. The multilayer capacitor of claim 3, wherein the melting point of the conductive connecting part is 300° C. or less.

5. The multilayer capacitor of claim 1, wherein the conductive connecting part of the conductive resin layer includes $Ag_3Sn$.

6. The multilayer capacitor of claim 1, wherein the metal particles have a size of 0.2 μm to 20 μm.

7. The multilayer capacitor of claim 1, wherein the metal particles of the conductive resin layer are metal particles having spherical shapes, flake-shaped metal particles, or mixtures of metal particles having spherical shapes and flake-shaped metal particles.

8. The multilayer capacitor of claim 1, wherein a thickness of the intermetallic compound is 2.0 μm to 5.0 μm.

9. The multilayer capacitor of claim 1, wherein the external electrode further comprises a second electrode layer disposed on the conductive resin layer and contacting the conductive connecting part.

10. A multilayer capacitor comprising:
    a body including dielectric layers and internal electrodes; and
    an external electrode disposed on one surface of the body, respectively,
    wherein the external electrode includes:
    a first electrode layer disposed on one surface of the body and contacting the internal electrodes; and
    a conductive resin layer disposed on the first electrode layer and including a conductive connecting part including a low-melting-point metal, an intermetallic compound contacting the first electrode layer and the conductive connecting part, and a base resin covering the conductive connecting part and the intermetallic compound,
    the intermetallic compound has a form of a plurality of islands,
    the body includes first and second surfaces opposing each other, third and fourth surfaces connected to the first and second surfaces and opposing each other, and fifth and sixth surfaces connected to the first and second surfaces, connected to the third and fourth surfaces, and opposing each other, the internal electrodes are alternately exposed from the third and fourth surfaces of the body, the first electrode layers are disposed on the third and fourth surfaces of the body to be connected to exposed portions of the internal electrodes, respectively, the external electrodes include connection parts disposed on the third and fourth surfaces of the body and band parts extended from the connection parts to portions of the first and second surfaces of the body, respectively, and $t2/t1 \geq 0.05$ and $t3/t1 \leq 0.5$, in which t1 is a thickness of a central portion of the connection part, t2 is a thickness of a corner portion, and t3 is a thickness of a central portion of the band part.

11. The multilayer capacitor of claim 10, wherein the first electrode layer includes copper.

12. The multilayer capacitor of claim 10, wherein the conductive connecting part has a melting point lower than a hardening temperature of the base resin.

13. The multilayer capacitor of claim 12, wherein the melting point of the conductive connecting part is 300° C. or less.

14. The multilayer capacitor of claim 10, wherein the plurality of islands have a layer form.

15. The multilayer capacitor of claim 10, wherein the external electrode further comprises a second electrode layer disposed on the conductive resin layer and contacting the conductive connecting part.

16. A multilayer capacitor comprising:
a body including dielectric layers and internal electrodes; and
an external electrode disposed on one surface of the body, respectively,
wherein the external electrode includes:
a first electrode layer disposed on the one surface of the body and contacting the internal electrodes; and
a conductive resin layer disposed on the first electrode layer and including a plurality of metal particles, a conductive connecting part surrounding the plurality of metal particles, a base resin, and an intermetallic compound contacting the first electrode layer and the conductive connecting part,
the intermetallic compound has a form of a plurality of islands,
the body includes first and second surfaces opposing each other, third and fourth surfaces connected to the first and second surfaces and opposing each other, and fifth and sixth surfaces connected to the first and second surfaces, connected to the third and fourth surfaces, and opposing each other,
the internal electrodes are alternately exposed from the third and fourth surfaces of the body,
the first electrode layers are disposed on the third and fourth surfaces of the body to be connected to exposed portions of the internal electrodes, respectively,
the external electrodes include connection parts disposed on the third and fourth surfaces of the body and band parts extended from the connection parts to portions of the first and second surfaces of the body, respectively, and
$t2/t1 \geq 0.05$ and $t3/t1 \leq 0.5$, in which t1 is a thickness of a central portion of the connection part, t2 is a thickness of a corner portion, and t3 is a thickness of a central portion of the band part.

17. The multilayer capacitor of claim 16, wherein the plurality of islands have a layer form.

18. The multilayer capacitor of claim 16, wherein the external electrode further comprises a second electrode layer disposed on the conductive resin layer and contacting the conductive connecting part.

* * * * *